Feb. 27, 1945.  W. T. TABB  2,370,506
LUBRICATION SYSTEM FOR FUEL INJECTING PUMPS
Filed Aug. 11, 1943  2 Sheets-Sheet 1

INVENTOR.
WARNER T. TABB
BY
Hoguet, Neary & Campbell
his ATTORNEYS

Patented Feb. 27, 1945

2,370,506

UNITED STATES PATENT OFFICE 2,370,506

LUBRICATION SYSTEM FOR FUEL INJECTING PUMPS

Warner T. Tabb, Brooklyn, N. Y., assignor to Eisemann Corporation, Brooklyn, N. Y., a corporation of Delaware Application August 11, 1943, Serial No. 498,246

20 Claims. (Cl. 103—154)

This invention relates to lubricating systems, and relates particularly to lubricating systems for pumps for supplying fuel to the cylinders for combustion chambers of Diesel type engines.

The fuel injecting pumps of Diesel engines usually include a plurality of cylinders and pistons with associated valve means, whereby reciprocation of the pistons by cams or other mechanical elements forces the fuel in measured increments into the cylinders under very high pressure to atomize the fuel.

While such fuel injecting pumps are precision fitted devices, the high pumping pressures almost invariably cause some leakage of the fuel past the pistons. Leakage of the fuel introduces serious difficulties in lubricating the pumps.

Many systems have been devised for lubricating such pumps, without complete success, for the reason indicated above.

Many of the prior fuel injecting pumps are provided with sumps within the pump casing for receiving lubricating oil. The sump is supposed to be charged periodically by an attendant so that a desired oil level will be maintained therein. However, it quite often happens that addition of oil to the pump is forgotten and damage to the pump results.

Another disadvantage of this type of lubricating system is that fuel leaking past the pump pistons dilutes the lubricating oil and reduces its lubricating function. In order to obtain adequate lubrication, therefore, it is necessary to drain the sump at frequent intervals and replace the lubricant, an operation which is often forgotten.

Other systems include connections to the oil pump of the engine so that a force feed system of lubrication is provided. Usually, the oil is withdrawn from the crankcase of the engine and delivered to the sump. In an arrangement wherein the oil is not returned to the lubrication system, the supply of oil in the crankcase is depleted. When the oil is returned to the lubrication system, it may be diluted by the fuel leaking through the pump and the entire batch of oil in the system eventually is diluted undesirably and must be replaced. Moreover, with these prior systems, there is a tendency for the level and the pressure of the oil in the sump to vary, thereby varying the lubricating action and in some instances varying the characteristics of the pump.

An object of the present invention is to provide a lubricating system for fuel injection pumps by means of which the disadvantages of the prior art constructions are overcome.

Another object of the present invention is to provide a lubrication system for fuel injection pumps in which dilution of the lubricant is minimized or completely prevented.

Another object of the invention is to provide a lubrication system for fuel injection pumps in which a substantially constant quantity of lubricant is present for lubricating the pump during all conditions of operation of the engine.

A further object of the invention is to provide lubricating systems for fuel injection pumps that are self-draining and which maintain a substantially constant oil level in such pumps under all operating conditions.

A still further object of the invention is to provide a system for lubricating fuel injection pumps in which the lubricant is maintained under pressure sufficient to balance substantially the pressure of the fuel supplied to the pump to prevent leakage of the fuel into the sump where it undesirably dilutes the lubricant.

An additional object of the invention is to provide a pressure lubricating system for fuel injection pumps wherein a quantity of air is trapped in the sump of the pump to cushion the action of the elements of the pump and thereby reduce operating shock.

A still further object of the invention is to provide a system for replenishing the air in the sump whereby a substantially constant relationship may be maintained between oil pressure and fuel pressure.

Other objects of the invention will become apparent from the following disclosure of typical forms of lubricating systems embodying the present invention.

Lubricating systems embodying the present invention are characterized generally by the provision of means for supplying lubricant under pressure to the sump of a fuel injecting pump and returning the lubricant from the sump to the crankcase while maintaining oil in the sump under conditions of pressure such that escape of fuel from the pump into the lubricant is substantially avoided.

More particularly, systems embodying the invention may include a source of lubricating oil under pressure for delivering the oil to the sump of a fuel injecting pump where the volume of the oil is maintained substantially constant by suitable pressure-responsive valve means that either regulate the supply of oil to the sump or permit a controlled return of excess oil to the supply source. By regulating the pressure-responsive characteristics of the valve means, sufficient pressure can be maintained in the sump to minimize fuel leakage past the pistons of the pump into the sump.

The system may be provided with an air-trapping mechanism which minimizes the escape of air from the sump during operation of the pump, but permits the entry of filtered air into and draining of the sump when the pump is idle.

For a better understanding of the present invention, reference may be had to the accompanying drawings in which:

Figure 3 is a view in section, partly broken away, of a still different type of lubricating system for a fuel injecting pump.

Figure 1:
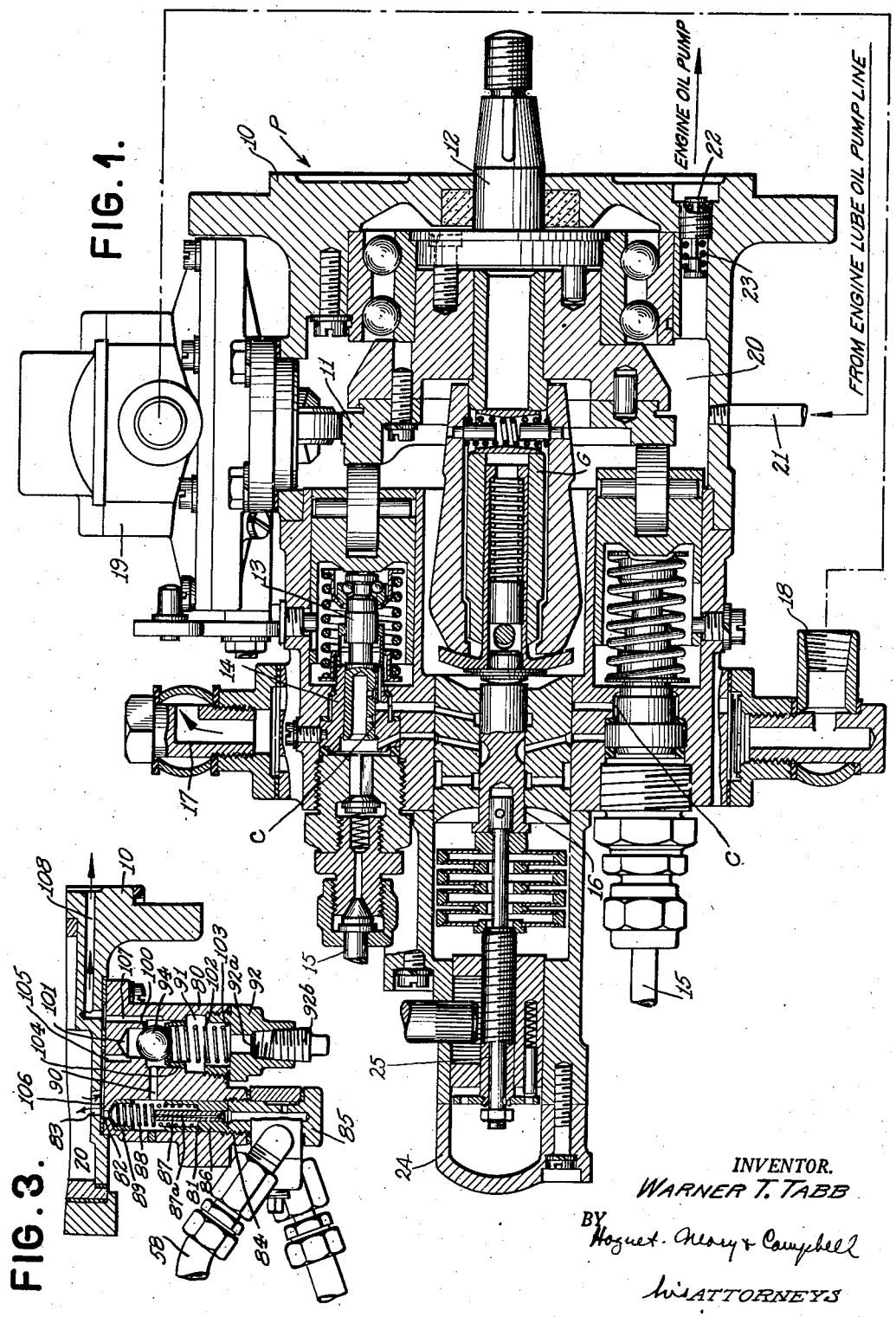
Figure 1 is a view, partly in section, of a typical form of fuel injecting pump to which one form of lubricating means embodying the invention is applied.

In order to illustrate the invention, it is shown as applied to a known type of fuel injection pump for a multiple cylinder type of Diesel engine.

The fuel injection pump P is generally of the type disclosed in the United States Reissue Patent No. Re. 21,966 to Everett M. Purdy, dated December 2, 1941, and includes a pump casing 10 in which is rotatably mounted a driving cam 11 carried by a shaft 12 that is coupled to and driven by the engine (not shown). The cam 11 acts to reciprocate a plurality of pistons 13 in suitable cylinder bushings 14 to deliver fuel through the outlet connections 15 to the individual cylinders of the engine. The piston and cylinder construction may be similar to that disclosed in the Purdy reissue patent or it may be of the type shown in the Tabb application, Serial No. 429,464, filed February 4, 1942, as illustrated.

The pump also is preferably provided with a centrally located centrifugal governor mechanism G of the type disclosed in the Tabb Patent No. 2,168,372, dated August 8, 1938. The governor mechanism G includes a valve member 16 that distributes fuel to the inlets of the cylinders 14 and regulates the return of excess fuel to the source of supply through a connection 17.

The fuel under low pressure may be supplied to the inlet 18 by means of a pulsating type of diaphragm pump 19 of the type disclosed in the Tabb application, Serial No. 435,117, filed March 17, 1942, or in the Tabb copending application, Serial No. 502,262, filed September 14, 1943, so that a steady flow of fuel may be delivered through the valve member 16 to the injection cylinders 14 at a low pressure. It is to be noted that the low pressure fuel is supplied to the low pressure fuel chambers C adjacent to the right hand end of the cylinders 14. Thus high pressure fuel leaking past the pistons 13 will flow into the low pressure chambers C and will be returned to the cylinders 14. In this way, leakage is reduced to a minimum inasmuch as only low pressure fuel can escape past the pistons 13. Inasmuch as the pump structure generally is unimportant from the standpoint of the present invention, it is thought that further description of the pump and its operating elements is unnecessary herein. It will be understood that the pump P is chosen for purposes of illustration, only.

The casing 10 of the pump P is provided with a sump 20 in which the cam 11 is located and in which the oil is received to lubricate the cam 11, the pistons 13, the governor G and the bearings for the shaft 12. If the sump 20 were partially filled with lubricating oil under atmospheric pressure, some of the low pressure fuel delivered by the pump 19 might escape unavoidably past the pistons 13 and associated gear into the sump 20, particularly after the pump has been in service for an extended period of time, with consequent dilution of the lubricating oil therein and the level of the mixture of fuel and lubricant would increase with the result that the operation of the governor G might be rendered inaccurate by spinning in or paddling the oil.

In order to avoid the dilution of the oil and to maintain the lubricant in the sump at a desired level or depth, it is proposed, in one form of the invention, to supply oil from the lubricating system of the engine to the sump 20 and circulate it therethrough. As shown in Figure 1, oil is introduced into the bottom of the sump 20 through a conduit 21 which is connected to the force-feed lubricating system or oil pump of the engine, preferably on the downstream side of the oil filter (not shown) so as to deliver clean oil into the sump.

Inasmuch as the oil is usually circulated in the lubricating system of the engine by means of a gear or impeller type pump, the sump 20 would be pumped full of lubricating oil if provision were not made to permit discharge of oil from the sump.

In its simplest form, the discharge means for regulating the level of the oil in the sump may consist of a valve member 22 which is seated normally by means of a spring 23 under sufficiently high compression to prevent displacement of the valve until a predetermined pressure is attained in the sump. The pressure selected for displacement of the spring preferably will be approximately that of the low pressure fuel, for the reason that the pressure in the sump will then resist any tendency of the low pressure fuel to escape into the sump. When this pressure is reached, the valve 22 is displaced from its seat, permitting the discharge of the oil through the valve to the engine oil sump or crankcase. The oil will not be discharged from the sump 20 until the sump is filled, unless some means is provided for exerting a sufficient pressure on the oil to maintain it at a predetermined level. This means, as shown in Figure 1, may consist of air trapped in the sump above the level of the oil. The air is trapped by sealing the casing of the pump so as to prevent the escape of air therefrom. Sealing of the pump may be accomplished by securing a cap 24 on the end of the casing 10 of the pump covering the end of the rack plunger 25 which is associated with the valve member 16 and by suitably sealing all other joints through which air might escape from the pump casing 10 to the exterior atmosphere. In this way, the air may be compressed in the sump 20 until a sufficiently high pressure is attained to cause unseating of the valve 22 and discharge of oil back to the engine oil sump or crankcase. Therefore, the level of the oil will remain the same in the sump 20 regardless of the speed of operation of the engine and of the pump P. The level of the oil will be controlled, of course, by the strength of the spring 23 and the area of the valve 22, inasmuch as these elements are responsive to the pressure of the oil and the air above the oil. The entrapped air serves also to cushion the reciprocating pistons 13. If the sump were filled with lubricant, the entire casing would be subjected to hydraulic shock as the pistons 13 reciprocate. The entrapped air effectively prevents such hydraulic shock.

The pressure of the oil and the air in the sump 20 can be controlled to value substantially equal to or greater or less than the pressure of the low pressure fuel in the system and this tends to resist leakage of the fuel into the sump 20.

Figure 2:
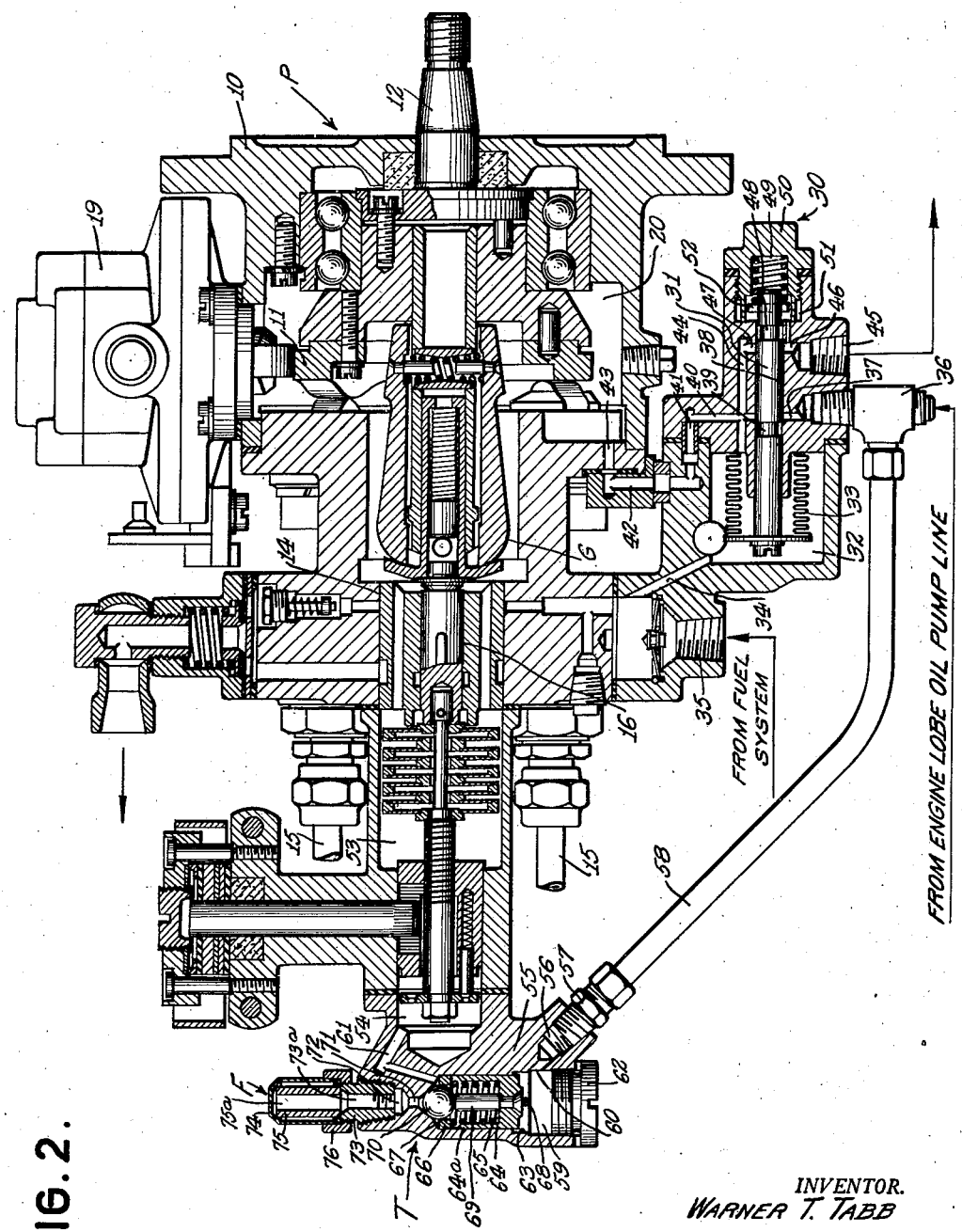
Figure 2 is a view, partly in section, of a fuel injecting pump of the type disclosed in Figure 1, showing a modified form of lubricating system as applied thereto.

A somewhat different system of lubrication, illustrated more particularly in Figure 2, may be used for maintaining a desired relationship between the pressures of the oil and the low pressure fuel. This lubrication system is illustrated as applied to a pump of the type disclosed in Figure 1.

The form of lubricating system disclosed in Figure 2 includes a casing 30 which is secured to the pump casing 10, preferably beneath the same, and containing a valve plunger 31 by means of which control may be had over the supply of oil to the pump sump 20 and return of oil therefrom.

The valve casing 30 contains an enlarged cavity 32 containing a bellows 33 which is connected to the valve plunger 31 and causes axial movement thereof in response to contraction and expansion of the bellows 33. The chamber 32 is connected by a duct 34 to the connection 35 through which low pressure fuel is supplied to the valve 16 and the pump cylinders 14. Thus, the valve plunger 31 is shiftable to the right, as viewed in Figure 2, in response to pressure exerted on the bellows 33 by the low pressure fuel.

Lubricating oil for the pump is supplied from the engine lubricating system through a nipple 36 which is connected with a vertically extending duct 37 terminating at the bore 38 in which the valve plunger 31 is slidably fitted. The valve plunger 31 is provided with a groove 39 which, when aligned with the duct 37, permits flow of the lubricant into an aligned duct 40. The upper end of the duct 40 is connected by a transverse bore 41, a vertical bore 42 and another transverse bore 43 to the sump 20 of the pump P, thereby permitting the lubricant to flow through the nipple 36 past the valve plunger 31 into the pump sump 20 when the pressure on the exterior of the bellows 33 is sufficiently great to force the plunger 31 into such a position that the groove 39 is in alignment with the conduits 37 and 40.

In order to regulate the pressure of the oil and air trapped in the sump with relation to the pressure of the low pressure fuel, the casing 30 is provided with a transverse bore 44 communicating with the interior of the bellows 33, and the passage 40 and extending therebeyond toward the right hand end of the casing. In this way, the lubricating oil may be delivered into the interior of the bellows 33 and acts to expand the bellows to force the valve plunger 31 to the left to prevent communication between the conduits 37 and 40. The area of the end of the bellows 33 exposed to lubricant pressure is less than the area exposed to fuel pressure and unless compensated, the pressure of the lubricant in the sump will exceed the pressure of the fuel.

The casing 30 is provided with a second coupling or nipple 45 which may be connected to a conduit leading to the crankcase of the engine and which communicates with a bore 46 in the casing 30. The bore 46 terminates at the cylinder 38 and is in alignment with another passage 47 on the opposite side of the cylinder 38 which connects with the bore 44.

The valve plunger 31 is provided with another annular groove 48 which permits communication between the bores 46 and 47 so that oil can drain from the sump through the conduits 43, 42, 41, 40, 44, 47 and 46 to the nipple 45. The groove 48 is normally maintained in alignment with the bores 46 and 47 when the engine and the pump are idle by means of a spring 49 which is mounted in a cap 50 threaded into a recess 51 in the end of the casing 30 which communicates with the passage 46 to maintain the recess 51 at about atmospheric pressure. The spring 49 bears against the cross pin 52 in the end of the plunger 31 and thereby urges it to the left, as viewed in Figure 2. The spring 49 may be utilized to compensate for the difference in areas of the bellows acted upon by the lubricant and the fuel to balance their pressures exactly, if desired.

In order to maintain a desired oil level and pressure within the sump 20, to facilitate draining of the sump and to replenish the air in the pump sump when needed, an air trapping and ventilating member T is mounted on the left hand end of the casing 10 of the pump and closes the chamber 53 therein in which the governor mechanism G, including the valve 16, is mounted. The sump 20 is in communication with the chamber 53 and communicates with the chamber 54 in the casing 55 of the air trapping and ventilating device T.

The casing 55 of the device T is provided with an inclined threaded bore 56 for receiving a nipple 57 on the end of a conduit 58 that is connected to the nipple 36 so that lubricating oil under pressure is delivered into the threaded bore 56.

The casing 55 is further provided with a vertically extending enlarged bore 59 which communicates with the bore 56 by means of a bore 60 and the chamber 54 by means of an upwardly directed angular passage 61. The lower end of the bore 59 is closed by a plug 62 threaded therein.

The upper portion 63 of the cavity 59 is of reduced cylindrical cross-section and forms a cylinder for the reception of a piston or plunger 64. The piston 64 is provided with upwardly extending flanges 64a engaging the walls of the cylinder 63 and receives therein a spring 65. The spring 65 bears against a ball-centering washer or ring 66 which engages against a conical portion 67 forming the upper end of the cylinder 63 so that the piston 64 is normally urged downwardly into engagement with a cross pin 68 that limits its downward travel.

The piston is provided with a centrally located pin 69 that bears against a ball 70 which seats against the conical portion 67 of the chamber and forms therewith a ball valve. When the motor is idle and the oil in the system is not under pressure, the spring 65 normally urges the piston 64 downwardly and the ball falls by gravity from the seat 67, thereby permitting communication between the chamber 54 and the conduit 71 above the ball. The conduit 71 communicates with an internally threaded chamber 72 in which is received a coupling 73 for an air filter unit F. The air filter unit F may consist of a perforated casing 74 within which is mounted a tubular element 75 formed of fine wire mesh, metal wool or other porous filtering medium having a central passage 75a that communicates with the passage 73a in the coupling 73. The porous member 75 and the casing 74 may be connected with the coupling 73 by means of a threaded ring 76 which is threaded on the upper end of the coupling 73.

Upon operation of the engine, lubricating oil is forced from the lubricating pump through the coupling 36, the conduit 58 into the chamber 59, forcing the piston 64 upwardly and seating the ball 70 in the seat 67. At the same time, operation of the motor and of the pump 19 will create a pressure on the low pressure fuel which reacts upon the bellows 33, displacing the plunger 31 to the right and permitting lubricating oil to flow into the sump 20. Lubricating oil will continue to flow into the sump 20 freely, compressing the air therein, until the pressure on the oil becomes sufficient to react upon the bellows 33 and displace the valve plunger to the left, thereby shutting off the supply of lubricating oil to the sump 20 and equalizing the pressure in the sump against the low pressure fuel supply. Equalization of the pressure effectively prevents leakage of the fuel into the sump 20 and prevents dilution of the lubricating oil therein. This condition will prevail until the motor is stopped or until the pressure in the sump increases or decreases, for one reason or another, whereupon the valve plunger 31 will be actuated either to permit oil to drain partially or completely from the sump or to supply more oil to the sump.

Upon stoppage of the motor, the pressure on the fuel will decrease and the plunger 31 will be forced to the left, as viewed in Figure 2, thereby permitting the compressed air in the sump to force the oil at least partially from the sump 20, through the passages 40, 44, the groove 48 in the plunger, the conduits 47 and 46 to the crankcase of the engine. The decreased pressure on the oil at the same time permits the piston 64 in the ventilating device T to be forced down by the spring 66, and when the pressure in the pump sump has fallen sufficiently as above described, the ball 70 drops upon further reduction of pressure to permit air to flow into the sump 20, thereby completely draining the oil from the sump 20 and replenishing the air if any has been lost by leakage.

Another form of lubricating mechanism is illustrated in Figure 3 of the drawings. This form of lubricant control mechanism is utilized in conjunction with a ventilating and air-trapping mechanism T of the type shown in Figure 2.

The lubricating mechanism in Figure 3 is, as illustrated, secured to the lower portion of the pump casing 10 directly beneath the sump 20. This mechanism includes a casing 80 having a vertically extending cylindrical bore 81 therein forming the cylinder of a pressure controlled valve. The upper end of the cylinder 81 communicates through a reduced passageway 82 with an opening 83 in the bottom of the casing 10 and with the interior of the sump 20. The lower end of the cylinder 81 is provided with a threaded portion 84 for receiving a coupling 85 through which lubricating oil is delivered by the oil pump to the cylinder 81 and to the conduit 58 which is connected to the ventilator and air-trapping device T as described above. Above the coupling 85 and within the bore 81 is mounted a sleeve piston 86 having an axially extending tube 87 therein with a very small, almost capillary size opening 87a therethrough. The piston 86 is normally urged downwardly by means of a coil spring 88 engaging the piston and a bushing 89 at the upper end of the cylinder 81. This arrangement is such as to cause the piston 86 to move upwardly when lubricating oil under pressure is delivered into the cylinder 81 through the fitting 85 to cover a lateral passage 90 in the casing which communicates with another chamber 91 of generally cylindrical cross-section at one side of the bore 81. Oil can enter the sump 20 only through the passage 87a which acts to meter the flow of the fluid.

With the piston in its lowermost position, oil can drain from the sump into the upper portion of the cavity 81 through the transverse passage 90 and into the chamber 91. The lower end of the chamber 91 is sealed by means of a fitting 92 threaded into the lower end of the chamber. The fitting 92 may have a central passage 92a permitting its connection to the crankcase. As illustrated, the central passage is closed by means of a threaded plug 92b.

In order to control the pressure and quantity of lubricant in the sump 20, a pressure-responsive valve is provided in the chamber 91. This valve consists of a ball 94 which is normally urged upwardly against the shoulder 100 provided by a reduced bore 101 at the upper end of the chamber 91 by means of a spring 102 which seats in the recess 103 in the fitting 92 and against a ball centering ring 104 that engages the ball 94. The reduced bore 101 communicates through a passage 105 with a space 106 that is in communication with the opening 83 and the bore 82 in the pump casing 10 and the valve casing 80, respectively. Another conduit 107 communicates with the chamber 91 below the ball 94 and connects the chamber with a conduit 108 in the casing 10 of the pump which permits return of lubricating oil to the crankcase of the engine.

In operation, lubricating oil is delivered into the interior of the fitting 85 and into the cylinder 81 where it acts to force the piston 86 upwardly, thereby closing the passage 90 and causing the oil to enter the sump 20 through the capillary opening 87a. When the oil compresses the air sufficiently so that the oil pressure acts upon the ball 94 and compresses the spring 102, the ball is unseated and oil can escape from the sump 20 through the passages 83, 106, 105, into the chamber 101, past the ball 94 into the chamber 91 and through the conduits 107 and 108 to the crankcase. This condition prevails until the motor is stopped. Upon stoppage of the motor, lubricating oil is no longer delivered to the chamber 81 and as a consequence the piston 86 will be moved downwardly by the spring 88 and the pressure of the oil and air in the sump 20 until it uncovers the transverse passage 90. At this time, the oil can drain rapidly into the cavity 91 and will flow through the ducts 107 and 108 into the crankcase of the engine. When the pressure of the oil has dropped sufficiently, the ventilator device T (not shown) will be opened, as described above, to permit air to flow into the sump 20, thereby allowing substantially all of the oil to be drained from the sump 20 and the latter to be filled with filtered air.

From the preceding description of typical forms of lubricating systems embodying the present invention, it will be apparent that adequate lubrication of the fuel injecting pump is attained without the use of an excessive amount of oil and without dilution of the oil by the escape of fuel into the lubricant sump. It will be understood, of course, that the forms of the invention may be modified considerably, that various types of valves, equivalent to the piston type and ball type valves, disclosed herein, may be used instead of the valves described herein and that the points of connection, for example, between the fuel supply lines and the valve controlling mechanism, as shown in Figure 2 of the drawings, may be varied widely so long as the valve is responsive to both fuel pressure and to lubricating oil pressure. Accordingly, the forms of the invention described above should be considered as illustrative, only, and not as limiting the scope of the following claims.

I claim:
1. In an apparatus for lubricating pumping devices having pumping means, a sump for receiving lubricating oil and means in said sump for actuating said pumping means; the combination of means for delivering lubricating oil to said sump under pressure, means for trapping air in said sump to subject the oil to pressure in the sump, and means responsive to a predetermined pressure on said oil for draining oil from said sump to maintain the oil in said sump under substantially constant pressure with said sump only partially filled.

2. In an apparatus for lubricating pumping devices having at least one cylinder, means for supplying fluid to said cylinder, a piston for forcing fluid from said cylinder, a sump for receiving lubricating oil, and means in said sump for reciprocating said piston; the combination of means for delivering lubricating oil to said sump under pressure, means for trapping air in said sump to be compressed by the oil delivered to said sump, and valve means responsive to the pressure of said compressed air for draining oil from said sump to maintain a substantial pressure in said sump.

3. In an apparatus for lubricating pumping devices having at least one cylinder, means for supplying low pressure fluid to said cylinder, a piston for forcing fluid from said cylinder, a sump for receiving lubricating oil, and means in said sump for reciprocating said piston; the combination of means for delivering lubricating oil to said sump under relatively high pressure, means for trapping air in said sump to be compressed by the oil delivered to said sump to oppose leakage of said low pressure fluid into said sump, and valve means responsive to the pressure of said compressed air and said low pressure fluid for delivering oil to and for draining oil from said sump to maintain a predetermined relationship between the pressures of the low pressure fluid and the air in the sump.

4. In an apparatus for lubricating fuel injecting pumps having at least one pump cylinder, means for supplying low pressure fluid to said cylinder, a piston in said cylinder, a sump for receiving lubricating oil and means for actuating said piston; the combination of means for supplying lubricating oil under pressure, means for trapping air in said sump, valve means having a connection with said sump and said oil supplying means and another connection for drawing oil from said sump, and means responsive to pressures of said low pressure fluid and the air in said sump for delivering oil to said sump and for draining oil from said sump, selectively, to maintain a substantially constant relationship between the pressures of said low pressure fluid and the air trapped in said sump.

5. In an apparatus for lubricating fuel injecting pumps having an inlet for low pressure fuel, and a discharge for high pressure fuel; and a sump for receiving lubricating oil into which fuel might leak from said inlet, the combination with a source of lubricating oil under pressure of a valve casing having an inlet passage communicating with said sump and said source of lubricating oil under pressure, a discharge passage communicating with said sump for drawing said oil from said sump, a valve member movable to one position to open said inlet passage and close said discharge passage and movable to another position to close said inlet passage and open said discharge passage, and means responsive to the pressure of said low pressure fuel and the oil pressure in said sump for selectively moving said valve member to maintain a predetermined relationship between the pressures of said low pressure fuel and the oil in said sump and thereby oppose leakage from said inlet into said sump.

6. In an apparatus for lubricating fuel injecting pumps having a sump for receiving lubricating oil, an inlet for low pressure fuel adjacent to said sump, a discharge for high pressure fuel, pumping means for drawing fuel from said inlet and discharging it from said discharge, and means in said sump for actuating said pumping means; the combination with a source of lubricating oil under pressure of a valve casing having an inlet passage communicating with said sump and said source of lubricating oil under pressure and a discharge passage communicating with said sump for drawing said oil from said sump, a valve member movable to one position to open said inlet passage and close said discharge passage and movable to another position to close said inlet passage and open said discharge passage, and diaphragm means responsive to the pressure of said low pressure fuel and the pressure in said sump for selectively moving said valve member to maintain a predetermined relationship between the pressure of said low pressure fuel and the pressure in said sump, and thereby oppose leakage from said pumping means into said sump.

7. In an apparatus for lubricating fuel injecting pumps having a sump for receiving lubricating oil, an inlet for low pressure fuel and a discharge for high pressure fuel; pumping means for drawing fuel from said inlet and discharging it from said discharge, and means in said sump for actuating said pumping means; the combination with a source of lubricating oil under pressure of a valve responsive to pressure of said lubricating oil communicating with said sump for trapping air in said sump to oppose leakage from said pumping means into said sump, a valve casing having an inlet passage communicating with said sump and said source of lubricating oil under pressure, a discharge passage communicating with said sump for drawing said oil from said sump, a valve member movable to one position to open said inlet passage and close said discharge passage and movable to another position to close said inlet passage and open said discharge passage, and means responsive to the pressure of said low pressure fuel and the pressure in said sump for selectively moving said valve member to maintain a predetermined relationship between the pressure of said low pressure fuel and the pressure in said sump.

8. In an apparatus for lubricating fuel injecting pumps having pumping means a sump adjacent to said pumping means for receiving lubricating oil, means in said sump for actuating said pumping means, means forming a port for ventilating said sump, and means for supplying lubricating oil under pressure; the combination of valve means in said port responsive to pressure of said lubricating oil for closing said port and trapping air in said sump to oppose leakage from said pumping means into said sump, a first valve means interposed between said source and said sump for metering the flow of oil into said sump, and a second valve means responsive to pressure of oil and air trapped in said sump for draining oil from said sump when the pressure in said sump exceeds a predetermined maximum.

9. In an apparatus for lubricating fuel injecting pumps having pumping means, a sump adjacent to said pumping means for receiving lubricating oil, means in said sump for actuating said pumping means, means forming a port for ventilating said sump, and means for supplying lubricating oil under pressure; the combination of valve means in said port responsive to pressure of said lubricating oil for closing said port and trapping air in said sump to oppose leakage from said pumping means into said sump, and means for controlling the supply of oil to and the discharge of oil from the sump comprising, a valve casing having a pair of passages connected to said sump, one of said passages being an inlet for lubricating oil and the other adapted to discharge lubricating oil, a movable plunger in said one passage having a metering aperture therethrough for regulating the flow of oil to the sump, a third passage connecting said first and second passages, said third passage being uncovered by said plunger when the oil pressure decreases to discharge oil from said sump into said other passage and covered by said plunger when the oil pressure increases, and a normally closed pressure responsive valve in said other passage for discharging oil from said sump when the pressure in said sump exceeds a predetermined maximum.

10. In a lubricating system for fuel injecting pumps having pumping means, a sump adjacent to said pumping means to be supplied with lubricating oil under pressure, and means in said sump for actuating said pumping means; the combination of a valve casing having an inlet passage communicating with said sump and an oil discharge passage communicating with said sump, a check valve at the end of said discharge passage adjacent to said sump permitting oil to flow only from said sump to said passage, a third passage connecting said oil inlet passage to said discharge passage at a point remote from the sump, a piston in said inlet passage movable from a position uncovering said third passage, to a position covering said third passage in response to pressure of lubricating oil thereon, and a metering passage through said piston.

11. In a lubricating system for fuel injecting pumps having pumping means, a sump adjacent to said pumping means to be supplied with lubricating oil under pressure, and means in said sump for actuating said pumping means; the combination of a valve casing having an inlet passage communicating with said sump and an oil discharge passage communicating with said sump, a check valve at the end of said discharge passage adjacent to said sump permitting oil to flow only from said sump to said passage, a third passage connecting said oil inlet passage to said discharge passage at a point remote from the sump, a piston in said inlet passage movable from a position uncovering said third passage, to a position covering said third passage in response to pressure of lubricating oil thereon, means normally urging said piston to a position uncovering said third passage, and a metering passage through said piston.

12. In a lubricating system for fuel injecting pumps having a source of low pressure fuel, pumping means for drawing fuel from said source of low pressure fuel and discharging it at higher pressure, and a sump for receiving lubricating oil under pressure to prevent leakage of said low pressure fuel into said sump; the combination of a valve casing having an oil inlet passage, an oil discharge passage communicating with said sump, and a bore intersecting said passages, a valve plunger slidably mounted in said bore and having channels therein selectively movable into alignment with said passages, means forming a chamber adjacent one end of said bore, a bellows in and dividing said chamber into two separate compartments, one end of said bellows being connected to said plunger, means connecting one of said compartments with said source of low pressure fuel, and means connecting the other compartment with the inlet passage between said bore and said sump to render the valve plunger responsive to changes in fuel and oil pressure.

13. In a lubricating system for fuel injecting pumps having a source of low pressure fuel, pumping means for drawing fuel from said source of low pressure fuel and discharging it at higher pressure, and a sump for receiving lubricating oil under pressure to prevent leakage of said low pressure fuel into said sump; the combination of a valve casing having an oil inlet passage and an oil discharge passage communicating with said sump, and a bore intersecting said passages, a valve plunger slidably mounted in said bore and having channels therein selectively movable into alignment with said passages, means normally urging said plunger into a position to align one of said channels with said discharge passage, means forming a chamber adjacent one end of said bore, a bellows in and dividing said chamber into two separate compartments, one end of said bellows being connected to said plunger, means connecting one of said compartments with said source of low pressure fuel, and means connecting the other compartment with said sump to render the valve plunger responsive to changes in fuel and oil pressures.

14. In a lubricating system for fuel injecting pumps having pumping means for drawing liquid from a source of low pressure liquid and discharging it at higher pressure, a sump for receiving lubricating oil under pressure to prevent leakage of said low pressure fluid into said sump, said sump being provided with a ventilating port, a source of lubricating oil under pressure; the sub-combination of an air trapping and ventilating device for said sump comprising a casing having a chamber provided with a vent at one end, a passage adjacent thereto communicating with said ventilating port and another passage adjacent the other end communicating with said source of lubricating oil, a plunger in said casing between said passages, means urging said plunger toward said another passage, a valve seat adjacent to said vent, and a valve member between said plunger and said seat, whereby pressure of oil on said plunger urges said ball into said seat to close said vent, and decrease in oil pressure allows retraction of said plunger and displacement of said ball from said seat to allow communication between said sump and said vent.

15. In a lubricating system for fuel injecting pumps having pumping means for drawing liquid from a source of low pressure liquid and discharging it at higher pressure, a sump for receiving lubricating oil under pressure to prevent leakage of said low pressure fluid into said sump, said sump being provided with a ventilating port, a source of lubricating oil under pressure; the sub-combination of an air trapping and ventilating device for said sump comprising a casing having a chamber provided with a vent at one end, a passage adjacent thereto communicating with said sump and another passage adjacent the other end communicating with said source of lubricating oil, air filtering means at said vent, a plunger in said casing between said passages, means urging said plunger toward said another passage, a valve seat adjacent to said vent, and a valve member between said plunger and said seat, whereby pressure of oil on said plunger urges said member into said seat to close said vent, and decrease in oil pressure allows retraction of said plunger and displacement of said member from said seat to allow communication between said sump and said vent.

16. In a lubricating system for fuel injecting pumps having pumping means for drawing liquid from a source of low pressure liquid and discharging it at higher pressure, a sump for receiving lubricating oil under pressure to prevent leakage of said low pressure fluid into said sump, said sump being provided with a ventilating port, a source of lubricating oil under pressure; the sub-combination of an air trapping and ventilating device for said sump comprising a casing having a chamber provided with a vent at one end, a passage adjacent thereto communicating with said sump and another passage adjacent the other end communicating with said source of lubricating oil, a tubular porous filter member overlying said vent, a plunger in said casing between said passages, means urging said plunger toward said another passage, a valve seat adjacent to said vent, and a valve member between said plunger and said seat, whereby pressure of oil on said plunger urges said member into said seat to close said vent, and decrease in oil pressure allows retraction of said plunger and displacement of said member from said seat to allow communication between said sump and said vent.

17. In a lubricating system for pumps having a chamber for receiving fuel under low pressure, a cylinder for receiving fuel from said chamber, and a piston for discharging fuel from one end of said cylinder under high pressure; the combination therewith of a sump into which said piston extends for receiving lubricant, means for supplying lubricant under pressure to said sump and means responsive to the pressure in said chamber and the pressure in said sump for maintaining a substantially uniform relationship between said pressures to oppose leakage from said chamber into said sump around said piston.

18. In a lubricating system for pumps having a chamber for receiving fuel under low pressure, a cylinder for receiving fuel from said chamber, and a piston for discharging fuel from one end of said cylinder under high pressure; the combination therewith of a sump into which said piston extends on the opposite side of said chamber from said one end of said cylinder for receiving lubricant, means for supplying lubricant under pressure to said sump and means responsive to the pressure in said chamber and the pressure in said sump for maintaining a substantially uniform relationship between said pressures.

19. In a lubricating system for pumps having a cylinder, means for supplying fluid at low pressure to said cylinder, and a piston for forcing fluid from said cylinder intermittently; the combination of a sump into which said piston extends for receiving liquid lubricant, means for supplying lubricant under pressure to said sump and means responsive to the pressure of said low pressure fluid and the pressure in said sump for controlling the supply of lubricant to said sump to maintain a substantially constant relationship between the pressures in said sump and of said low pressure fluid.

20. In a lubricating system for pumps having a cylinder, means for supplying fluid at low pressure to said cylinder, and a piston for forcing fluid from said cylinder intermittently; the combination of a sump into which said piston extends for receiving liquid lubricant, means for trapping air in said sump, means for supplying lubricant under pressure to said sump and means responsive to the pressure of said low pressure fluid and the pressure in said sump for controlling the supply of lubricant to said sump to maintain a substantially constant relationship between the pressures in said sump and of said low pressure fluid.

WARNER T. TABB.